United States Patent [19]
Logan

[11] Patent Number: 5,875,853
[45] Date of Patent: Mar. 2, 1999

[54] SURGICAL SLIPPER FOR ANIMAL

[75] Inventor: Ernest F. Logan, Co. Antrim, United Kingdom

[73] Assignee: Giltspur Scientific Limited, Northern Ireland, United Kingdom

[21] Appl. No.: 967,773

[22] Filed: Nov. 12, 1997

Related U.S. Application Data

[63] Continuation-in-part of Ser. No. 878,061, Jun. 18, 1997, abandoned.

[51] Int. Cl.⁶ .................................. A01L 3/00; A01L 5/00
[52] U.S. Cl. ..................................... 168/18; 54/82
[58] Field of Search ................. 119/850; 168/1, 168/3, 18; 54/82

[56] References Cited

U.S. PATENT DOCUMENTS

| | | |
|---|---|---|
| 2,651,853 | 9/1953 | Lewis ........................................ 168/18 |
| 2,988,828 | 6/1961 | Anderson . |
| 3,236,310 | 2/1966 | Quick ........................................ 169/18 |
| 4,444,269 | 4/1984 | Laurent ....................................... 168/1 |
| 4,503,914 | 3/1985 | Voland ...................................... 168/18 |
| 5,272,857 | 12/1993 | Logan . |

FOREIGN PATENT DOCUMENTS

| | | |
|---|---|---|
| 225100 | 4/1958 | Australia . |
| 2560745 | 9/1985 | France . |
| 2012542 | 8/1979 | United Kingdom . |
| 2223152 | 4/1990 | United Kingdom . |

*Primary Examiner*—Thomas Price
*Attorney, Agent, or Firm*—Andrus, Sceales, Starke & Sawall

[57] ABSTRACT

A surgical slipper for a cleft footed animal. The slipper has a lattice of intersecting ribs 6 projecting downwardly from the sole 3. The upper surface of the sole 3 slopes downwards from back to front. The front of the sole has a curved profile.

18 Claims, 1 Drawing Sheet

SURGICAL SLIPPER FOR ANIMAL

CROSS-REFERENCE TO RELATED APPLICATIONS

This application is a continuation-in-part application of U.S. patent application, application Ser. No. 08/878,061, filed Jun. 18, 1997 and now abandoned.

BACKGROUND OF THE INVENTION

My earlier patent, U.S. Pat. No. 5,172,857, discloses a surgical slipper for cleft footed animals in either a left or right claw configuration, the slipper comprising a sole and upper which together define a cavity into which one claw of the cleft footed animal is, in use, fitted, with a lattice in the form of an array of intersecting ribs projecting from the underside of the sole; wherein the ribs are thick enough to hold the claw, in use, away from the ground and the sole is arranged to be thin enough in voids between the ribs so that a hole can be readily punched for drainage purposes. Such a slipper will be referred to as of the kind described.

Although such a slipper has been effective in reducing the pain and distress in lame cows, because of all the weight carried by the affected leg is transferred to one claw of the hoof, the application of such a slipper puts extra burden on the flexor tendons.

BRIEF SUMMARY OF THE INVENTION

According to the present invention a slipper of the kind described has a sole which is formed so that, when the slipper is placed lattice down on level ground, the upper surface of the sole slopes downwards from back to front. The slopping sole takes the pressure off the flexor tendons of the cow.

Preferably the upper surface of the sole slopes along its entire length. The angle of slope of the upper surface of the sole to the horizontal when the slipper is placed lattice down on level ground is preferably 1° to 5°, is more preferably 1.5° to 2° and is most preferably substantially 1.8°.

Other improvements which I have made include having at least one rib of the lattice reducing in width in the direction away from the sole. Also, the back corner of the slipper which, in use, will face the inside of the claw is curved with a radius of curvature of between 8 and 12 mm. This prevents interference with the other claw, thereby preventing pressure on and damage to the soft heel.

Still further, the front of the sole has a curved profile curving upwardly from the bottom of the sole. The radius of curvature of the profile is substantially equal to the thickness of the sole. This profile allows the cow to lift her foot in a less stressful manner.

BRIEF DESCRIPTION OF THE SEVERAL VIEWS OF THE DRAWING

An example of a slipper constructed in accordance with the present invention will now be described with reference to the accompanying drawing, in which.

DETAILED DESCRIPTION OF THE INVENTION

The illustrated surgical slipper comprises an injection molded unit, with a left claw configuration, which incorporates an upper consisting of a vertical part 1 which fits between the claws of the foot at the cleft, and a curved part 2 which can be considered to be the conventional upper part of a shoe, slipper or clog. This upper configuration has a base or sole 3 which is internally smooth and slopes from back to front downwards at an angle of, preferably, 1.8° with respect to the horizontal. The sole 3 is integral with the vertical part 1 and curved part 2. The corner 4 of the sole 3 behind the vertical part 1 is rounded with a radius of curvature of, preferably, 10 mm, thereby to prevent interference with the other claw of the animal's foot.

Figure 4:
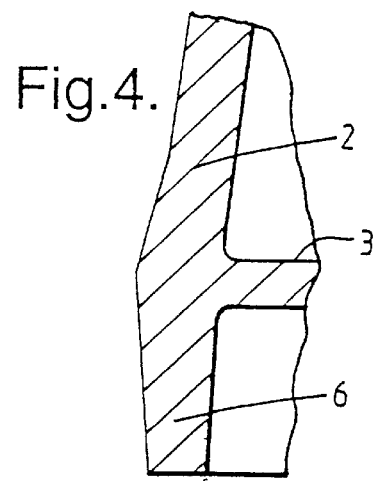
FIG. 4 shows a detail of a portion of the slipper shown in FIG. 3.
Figure 5:
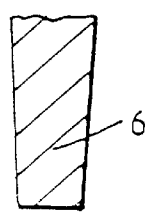
FIG. 5 is a cross section through a rib of the lattice.
Figure 6:
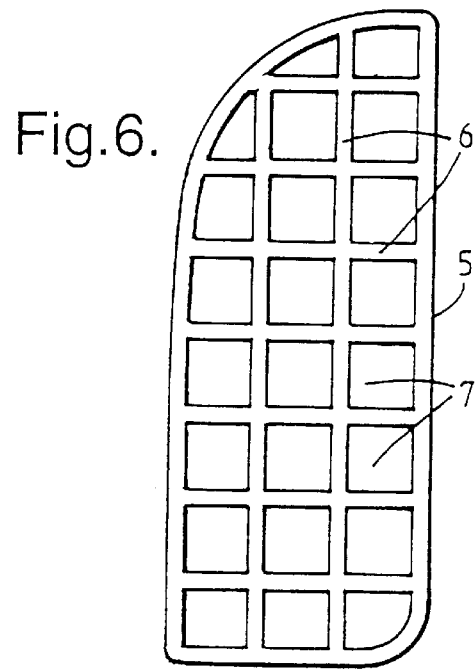
FIG. 6 is an underneath plan of the slipper.

The base or sole 3 has an external or wearing surface 5 which is molded in a lattice pattern and which effects a cushioning mode on the claw when in use. As can be seen in FIGS. 4 and 5, each rib 6 of the lattice tapers in section from top to bottom. It has been found that, when in use, the lattice voids 7 tend to consolidate with debris or detritus and this soon fills voids to the surface level so producing a contact area which is mainly compacted debris to ground rather than plastic to ground and this has the effect of rendering the footing anti-slip.

Figure 1:
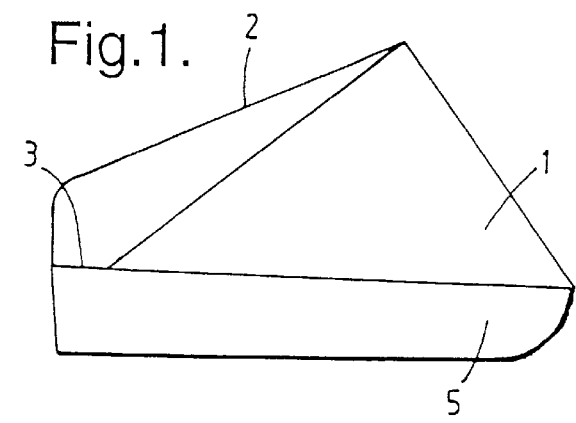
FIG. 1 is a side elevation of the slipper.
Figure 3:
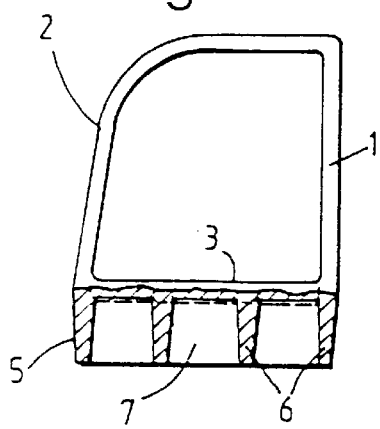
FIG. 3 is an elevation of the claw insert end of the slipper with the back of the lattice cut away.
Figure 2:
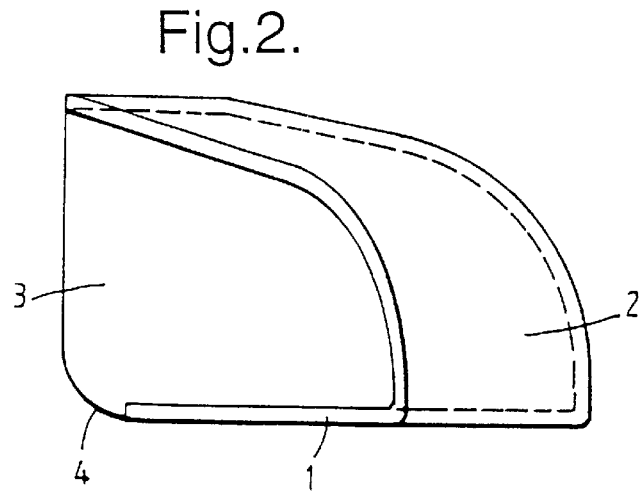
FIG. 2 is a plan view of the slipper.

As shown in FIG. 1, the front of base or sole 3 beneath vertical part 1 and curved part 2 has a, preferably convexly, curved profile 8 curving upwardly from the bottom of the sole. The radius of curvature of profile 8 is preferably substantially equal to the thickness of base or sole 3 at the front of the slipper. When the cow commences raising her foot, she tilts it forward before lifting it from the ground. The slipper rolls along the ground on the curved profile 8 from back to front as the slipper tilts forward, thereby reducing stress on the cow's leg.

Although the illustrated slipper has a left claw configuration, a right claw version is equally contemplated. This is simply a mirror image of the left claw version, so no specific description is necessary.

I claim:

1. A surgical slipper for cleft footed animals in either a left or right claw configuration, the slipper comprising a sole and upper which together define a cavity into which one claw of the cleft footed animal is, in use, fitted, with a lattice in the form of an array of intersecting ribs projecting from the underside of the sole; wherein the ribs are thick enough to hold the claw, in use, away from the ground; and wherein the sole is formed so that, when the slipper is placed lattice down on level ground, the upper surface of the sole slopes downwards from back to front, the angle of slope of the upper surface of the sole to the horizontal when the slipper is placed lattice down on level ground being 1° to 5°.

2. A slipper according to claim 1, wherein the upper surface of the sole slopes along its entire length.

3. A slipper according to claim 1, wherein the angle is from 1.5° to 2°.

4. A slipper according to claim 1, wherein the angle is substantially 1.8°.

5. A slipper according to claim 1, wherein at least one rib of the lattice reduces in width in the direction away from the sole.

6. A slipper according to claim 1 wherein the sole is arranged to be thin enough in voids between the ribs so that a hole can readily be punched through the sole for drainage purposes.

7. A slipper according to claim 1, wherein the back corner of the slipper which, in use, will face the inside of the claw is curved with a radius of curvature of between 8 and 12 mm.

8. A slipper according to claim 1, wherein the front of the sole has a profile which is curved upwardly from the bottom of the sole.

9. A slipper according to claim 8 wherein the sole has a convexly curved profile.

10. A slipper according to claim 9, wherein the curved profile has a radius of curvature substantially equal to the thickness of the sole.

11. A surgical slipper for cleft footed animals in either a left or right claw configuration, the slipper comprising a sole and upper which together define a cavity into which one claw of the cleft footed animal is, in use, fitted, with a lattice in the form of an array of intersecting ribs projecting from the underside of the sole; wherein the ribs are thick enough to hold the claw, in use, away from the ground; wherein the sole is formed so that, when the slipper is placed lattice down on level ground, the upper surface of the sole slopes downwards from back to front at an angle of from 1.5° to 2°, wherein the back corner of the slipper which, in use, will face the inside of the claw is curved with a radius of curvature of between 8 and 12 mm, and wherein the front of the sole has a profile which is curved upwardly from the bottom of the sole, the curved profile being convex and having a radius of curvature substantially equal to the thickness of the sole.

12. A surgical slipper for cleft footed animals in either a left or right claw configuration, the slipper comprising a sole and upper which together define a cavity into which one claw of the cleft footed animal is, in use, fitted, with a lattice in the form of an array of intersecting ribs projecting from the underside of the sole; wherein the ribs are thick enough to hold the claw, in use, away from the ground; and wherein the front of the sole has a profile which is curved upwardly from the base of the sole.

13. A slipper according to claim 12, wherein the front of the sole has a convexly curved profile.

14. A slipper according to claim 13, wherein the curved profile has a radius of curvature substantially equal to the thickness of the sole.

15. A slipper according to claim 12, wherein the curved profile has a radius of curvature substantially equal to the thickness of the sole.

16. A slipper according to claim 12, wherein at least one rib of the lattice reduces in width in the direction away from the sole.

17. A slipper according to claim 12, wherein the sole is arranged to be thin enough in voids between the ribs so that a hole can readily be punched through the sole for drainage purposes.

18. A slipper according to claim 12, wherein the back corner of the slipper which, in use, will face the inside of the claw is curved with a radius of curvature of between 8 and 12 mm.

* * * * *

UNITED STATES PATENT AND TRADEMARK OFFICE
CERTIFICATE OF CORRECTION

PATENT NO. : 5,875,853
DATED : March 2, 1999
INVENTOR(S) : Logan

It is certified that error appears in the above-indentified patent and that said Letters Patent is hereby corrected as shown below:

On the title page;

[30] Foreign Application Priority Data

July 23, 1996  United Kingdom  9615433

Signed and Sealed this

Twenty-fourth Day of August, 1999

Attest:

Q. TODD DICKINSON

*Attesting Officer*      *Acting Commissioner of Patents and Trademarks*